March 31, 1964 J. S. PALMER 3,126,893
COMBINATION CYLINDER TYPE THRESHING MACHINE
AND ROTATING SEPARATING DRUM
Filed Nov. 4, 1960 2 Sheets-Sheet 1

Inventor:
John S. Palmer
Paul O. Pippel
Atty.

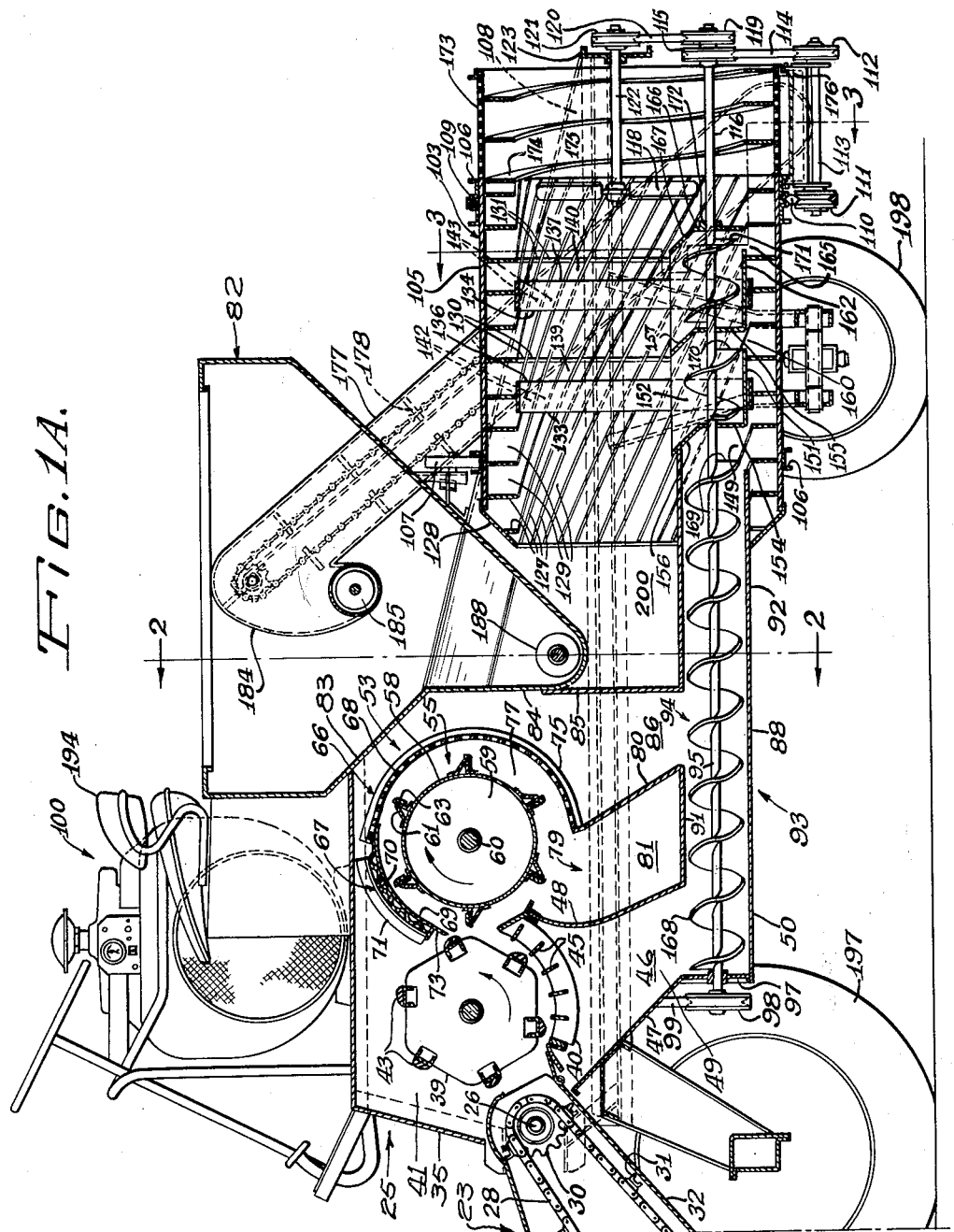

United States Patent Office

3,126,893
Patented Mar. 31, 1964

3,126,893
COMBINATION CYLINDER TYPE THRESHING MACHINE AND ROTATING SEPARATING DRUM
John S. Palmer, Clarendon Hills, Ill., assignor to International Harvester Company, Chicago, Ill., a corporation of New Jersey
Filed Nov. 4, 1960, Ser. No. 67,403
18 Claims. (Cl. 130—27)

This invention pertains to combines and especially to the thresher portion thereof.

Combines or harvester-threshers as they are otherwise known have from their inception been one of the largest and costliest of farm implements. This has been so because they have performed the several functions of harvesting standing grain, elevating the harvested grain into a threshing mechanism, threshing the grain, separating the grain from the straw and discharging the latter, cleaning the grain and discharging the chaff and foreign matter separated therefrom, and collecting the cleaned grain in a suitable receptacle with provision for unloading the same. With so many functions performed, it can readily be seen that the immense size and cost of such machines in the past have constituted very serious disadvantages.

Combines have also been characterized by the production of great vibration or shaking as the result of the use of reciprocating components which, besides the objectionable roughness of operation and great noise have required massive structure for the necessary rigidity and strength, thus further substantially increasing the size and cost of combines heretofore known.

It is accordingly a primary object of the invention to provide a combine which is of greatly reduced size, weight, and cost as compared with combines heretofore known.

Another primary object of the invention is to provide a combine in which the above noted great vibration or shaking is eliminated. This is accomplished by the elimination of all reciprocating parts.

Another important object is to provide a combine which is of extremely simplified construction, having much fewer parts than previous combines and fewer wear points for smaller overall size and initial cost and less maintenance and replacement of parts.

Another important object is to provide a combine which is not adversely affected by the terrain over which it is moving but which will perform all its operations efficiently on hillside fields as well as on level ground.

Another important object is to provide a combine in which all operating crop handling components rotate or move about centers for extremely smooth and quiet operation.

Another object is to provide a combine which is much more compact than previous combines and having a lower center of gravity so as to prevent tipping.

Another object is to provide a combine which requires less power to operate it than previous combines capable of handling the same amount of crop at the same rate and consequently a smaller size engine for less initial and operating cost.

Another object is to provide a combine having rotary cleaning means in which a single conveying means supplies the crop to be cleaned to the cleaner drum and also advances the crop through the drum.

Another object is to provide a combine having a longitudinally extending rotary cleaning drum and in which combine but a single, longitudinally extending conveyor moves the crop to be cleaned from under the thresher cylinder and rotary stalk-extracting means directly into the cleaning drum and also advances the crop through the drum as part of a plural stage cleaning process.

Another object is to provide a combine in which all crop processing components are rotary and the threshing is complete with no tailings and the necessary additional components to handle the same and return it to the threshing cylinder for rethreshing; thus to assist in the simplicity of construction, smaller size, and lower cost of the combine.

Another object is to provide a compact combine of simplified construction which can be utilized as a combine of either the pull or self-propelled type.

Other objects, advantages, and features of the invention will become apparent from the following description read in conjunction with the accompanying drawing, in which:

FIGS. 1 and 1A together comprise a vertical sectional view taken along the longitudinal center line of a combine embodying a preferred form of the invention;

FIG. 2 is a cross-sectional view taken along line 2—2 of FIG. 1 and in the direction indicated; and FIG. 3 is a cross-sectional view taken along line 3—3 of FIG. 1 and in the direction indicated.

Referring to the drawing figures in detail, the reference character 1 generally designates a combine platform having a cutter bar 2 across the front thereof and a wall 4 defining each side of the platform (only one wall being shown). A reel 7 is mounted for rotation on a pair of spaced-apart arm members 10 (only one of which is shown) extending forwardly from the side walls 4, respectively. A pair of curved rods 12 (only one of which is shown) connect the forward ends of the arms 10 to forwardly extending portions of the side walls 4, the rods together with the side walls 4 serving to guide and gather the standing grain into the scope of the cutter bar 2 at the forward end of the combine.

A straight through auger conveyor 15 is journally supported within the opposite side walls 4 of the platform, the conveyor being adjacent the bottom and rear walls 16 and 17 respectively. The auger conveyor is of conventional construction having a helical flight 18 at each end (only one flight being shown) for moving the cut grain towards the center and a plurality of laterally and circumferentially spaced retractable fingers 20 in the center portion for moving the grain under the center portion of the conveyor rearwardly.

The platform 1 is supported on a centrally disposed feeder housing 23, which feeder housing together with the platform 1 and members carried thereon is pivotally connected to the main, wheel supported portion 25 of the combine by means of shaft 26. The usual form of chain conveyor 28 moving around sprockets 29 and 30 is contained within the feeder housing 23, being effective to move the cut grain received from the auger conveyor 15 between the cross members 31 of the conveyor and the bottom plate 32 of the feeder housing upwardly into a housing portion 35 of the main portion 25 of the combine.

A conventional type threshing cylinder 39 together with its adjustably mounted concave 40 are mounted between opposite side walls 41 of the housing portion 35 in the forward end thereof so as to receive the cut grain from the feeder conveyor 28. The harvested grain is threshed by the rotating transversely extending rasps 43 of the threshing cylinder 39 in cooperation with the transversely extending members 45 of the concave 40 in the well-known manner, most of the separated grain falling through the concave and between forward, inclined and rearward, curved and inclined walls 47 and 48 respectively, and between the side walls 41 and lower inwardly inclined portions 46 thereof. The forward and rear wall portions 47 and 48 extend laterally between the opposite side walls 41 and their lower inwardly inclined portions 46 of the housing 35 to form, with the side walls and their portions 46 and together with a lower substantially semi-circular shaped portion 50, a hopper-like portion 49 for receiving and aggregating the grain passing through the concave 40.

Immediately behind the threshing cylinder 39 and its concave 40 is positioned means generally designated 53 for separating out the straw from the rest of the threshed grain received from the threshing means and discharging the straw from the combine. This straw removal means comprises a cylinder generally designated 55 extending between the side walls 41 of the housing portion 35 and rotatably mounted thereon, the axis of rotation of the latter cylinder being parallel to the axis of rotation of the threshing cylinder 39 and in the same horizontal plane thereof. The disclosed cylinder 55 comprises an outer cylindrical wall 58 supported on a pair of disc-shaped end members 59 through which extends a shaft 60 rotatably supported on the end walls 41 of the housing portion 35. Intermediate disc members like members 59 mal also be employed if desired. Circumferentially spaced radially outwardly extending portions 61 are supported on the outer periphery of the cylinder 55. These members extend across the entire length of the cylinder 55 and have flat front faces in the direction of rotative movement of the cylinder upon which faces are fixed grain contacting elements 63 likewise extending the entire length of the cylinder and which are rubber-coated in order not to injure the grain particles. The elements 63 and their supporting members 61 shown in the drawing are continuous; however, perforated members or other interrupted formations may be employed if desired. Also, although a cylindrical wall or shell 58 has been employed, such member may be omitted so as to provide an open type cylinder in which the grain contacting members such as 63 and their supporting members 61 are supported directly on rotating plate members such as 59 or the equivalent.

The straw removal means 53 also includes arcuate harvested grain engaging means generally designated 66. The arcuate means comprises a forward portion 67 and a rearward portion 68. The forward portion has a solid or unperforated arcuate portion 69 and a corrugated backing member 70 both of which extend substantially across the entire distance between the side walls 41 of the housing portion 35, being suitably supported on the side walls by an arcuate angle iron 71 at each end thereof (only one iron being shown). The angle irons 71 and their supported members 69 and 70 are adjustably mounted on the side walls 41 by means of slots (not shown) in the irons and bolts passing therethrough and the adjoining side walls 41 so as to be movable towards and away from the cylinder 55 or angularly relative thereto. A grain stripper angle iron member 73, also extending between the side walls 41, is supported at the lower, front end of the forward portion 67 of the arcuate means 66. The forward portion 67 provides an enclosed route for the passage of the harvested grain between the same and the cylinder 55 to the rearward portion 68 of the arcuate means 66 for the straw separation and removal operation.

The rearward portion 68 of the arcuate means 66 extends around the rear half of the cylinder 55 approximately 180° from the top to approximately the bottom thereof. The rearward portion 68 is a single perforated member extending substantially across the entire distance between the side walls 41 of the housing portion 35 being suitably mounted thereon by means of an arcuate angle iron 75 at each end thereof (only one iron being shown). The arcuate member 68 together with its supporting angle irons 75 are also adjustably mounted on the plates 41 by means of slots and bolts (not shown) for movement like that described in connection with the forward portion 67.

The threshing cylinder 39 and straw separator and discharge cylinder 55 are arranged to be driven in opposite directions of rotation, as indicated by the arrows, at high rates of speed by means of sheaves and V-belt drives (not shown). It is also seen that by the present arrangement the cut grain moves from the feeder conveyor 28 directly under the threshing cylinder 39 and over the top and around the backside of the separator cylinder 55, thus to provide an exceptionally short, smooth flow path of the harvested grain through the housing portion 35 of the combine of a reentrant doubled back form providing for maximum utility of space and compactness.

By the construction of the straw removal means 53 shown and the high rotational speed of the cylinder 55 thereof, the grain, chaff, and foreign matter such as dirt, small stones, burrs, and the like are moved towards the outside of the space 77 between the cylinder 55 and arcuate member 68, being expelled through the openings of the latter member so as to leave solely the long straw within the arcuate chamber 77 for discharge through the open bottom 79 thereof beyond the lower limit of the arcuate member 68 and between the transversely extending wall portions 48 and 80 forming the front and rear of a rearwardly inclined discharge chute or space 81, the straw falling thence onto the ground.

The housing portion 35 is defined and limited at the rear by the forward wall of the grain tank generally designated 82 and including a transversely extending inclined portion 83 and a transversely extending vertical portion 84 and by a transversely extending wall portion 85 continuing substantially in the plane of the wall portion 84 of the grain tank. The portions 83, 84, and 85 entirely close the rear of the housing portion 35 and together with the forward, rearwardly inclined wall portion 80, defining the rear of the straw discharge chute 81, and the opposite side walls 41 with their inwardly inclined lower portions 46 form a second hopper-like portion 86 for receiving and aggregating the grain, chaff and other matter passing through the arcuate member 68 of the straw remover 53. The bottom of the second hopper is a substantially semi-circular shaped portion 88 which is identical to and in alignment with the bottom portion 50 of the first hopper 49.

An intermediate section 91 of circular cross-section joins the hopper portions 50 and 88, the bottom half of the portion 91 being of the same size as portions 50 and 88 and being in smooth and direct continuity therewith. A closed portion 92 of circular cross-section and the same size as portion 91 and in continuity with the lower portions of the hopper bottoms 50 and 88 extends rearwardly from the rear wall 85 of the housing portion 35. The portion 92 together with the portions 91, 50, and 88 form a housing generally designated 93 for a single screw conveyor generally designated 94. The axis of this conveyor and of its housing 93 extends along the longitudinal center line of the combine as viewed in plan and is horizontal. The shaft portion 95 of the conveyor is journally supported in the forward end wall 97 of the conveyor housing 93 and of the front hopper 49, the conveyor being rotated by means of a sheave 98 and V-belt 99 connected in a suitable manner to the engine 100.

The conveyor housing 93, which forms part of and is rigidly supported by the forward housing portion 35 of the combine, extends rearwardly within the interior of a horizontally disposed rotary drum generally designated 103 which forms a principal portion of the cleaning means of this invention.

The axis of the drum 103 is along the longitudinal center line of the combine as viewed in plan and also parallel to and over the axis of the conveyor 94 and housing 93. The drum member 103 has an imperforated cylindrical outer wall 105 which is provided with forward and rearward channel-shaped annular tracks 106 extending around the outer periphery of the wall 105. These tracks are engaged by a plurality of rollers 107 suitably supported for rotation from the grain tank 82 or from a generally triangular shaped rearward extension 108 from each of the side walls 41 of the housing portion 35 of the combine, the extensions forming structural framing along each side of the combine. The rollers 107 obviously position and retain the rotary drum 103 in rotary movement. The outer wall 105 is also provided with a V-shaped annular groove structure 109 for rotating the drum by means of V-belt 110, sheaves 111 and 112 on shaft 113, V-belt 114, and sheave 115 on a rearward extension 116 of the conveyor shaft 95. A fan or blower 118, for a purpose to be explained hereinafter, is rotated by the same shaft extension 116 of the conveyor shaft 95 by means of sheave 119, V-belt 120, and sheave 121, the latter being mounted on the fan shaft 122. The latter shaft is suitably supported for rotation thereof and of the fan blades in a transversely extending channel member 123 supported at each of its ends by the extensions 108 of the side walls 41 of the housing portion 35.

The rotary drum 103 has a multiplicity of radially inwardly extending helically disposed wall portions 127 arranged on the inside of the cylindrical wall 105 thereof, which portions extend along the entire length of the member 103 including an inturned rim portion 128 thereof at the front open end of the same forming inwardly open helical passages 129 between the portions which passages also extend along the entire length of the rotary member 103. The passages 129 are interrupted by a multiplicity of dam elements 130 and 131 which extend across each of said passages forming in effect a pair of continuous longitudinally spaced-apart annular barriers around the inside of the drum member 103 at the locations observed in FIG. 1 of the drawing, thus to separate each of the passages 129 into three separate portions or sections thereof. Slightly forwardly spaced from the series of dams 130 and 131 are annular bands 133 and 134 respectively, which are joined to the inner edges of the helical plate elements 127 as by welding. These bands have rearward circular edges 136 and 137 respectively, falling in planes which are normal to the axis of rotation of the rotary member 103. These bands 133 and 134 close portions of each of the helical passages 129 passing thereunder and provide a first and a second annular gap or opening 139 and 140 respectively, between the rearward edges 136 and 137 respectively, of the bands and the series of dams 130 and 131 rearwardly of each respectively. These bands 133 and 134 therefore provide closed portions or pockets 142 and 143 of each of the helical passages 129 and open portions immediately rearwardly of each of the bands and extending to the respective series of dams or obstructions across the passages.

The longitudinally extending screw conveyor 94 extends from the forward end of the lower part of the housing portion 35 of the combine rearwardly through the conveyor housing 93 and within the rotary drum 103. The lower portion of the conveyor housing 93 is interrupted within the drum by an opening 149. The conveyor housing 93 continues beyond the interruption or opening 149 at 151. The lower portion of the continued portion 151 is of the same shape and size as the lower half of housing portion 92, for instance, and is in exact alignment with the same. The continued portion, however, is open at the top and has outwardly inclined side portions 152 and front and rear walls 154 and 155 with forwardly inclined portions 156 and 157, to in effect form a hopper for the reception and collection of partially cleaned grain, as will be explained hereinafter. The lower portion of the continued portion 151 is interrupted at the rear by an opening 160 which is similar to opening 149 in the portion 92 of the conveyor housing though somewhat smaller in longitudinal extent.

The conveyor housing 93 also continues beyond the second interruption or opening 160 as a second continued portion 162. The latter continued portion is of substantially identical form and size to the portion 151 except for the use of the rear wall 155, 157 of the portion 151 as the front of the portion 162. The hopper portion 162 is also in exact alignment and continuity with the portion 151 and is provided with an interruption or opening 165 in the lower portion thereof at the rear which is of somewhat less length than the opening 160 and a rear wall 166 with a forwardly inclined upper portion 167 as in the case of the portion 151.

The screw conveyor 94 extends entirely through the conveyor housing 93 including the continued portions 151 and 162 thereof. The material moving helical screw portion 168 of the conveyor, however, is interrupted or discontinued over short distances at 169, 170, and 171 adjacent the openings 149, 160, and 165 of the conveyor housing so as not to be obstructed by and to permit the presence of the transverse walls 154, 155, and 166 with their rearwardly inclined upper portions 156, 157, and 167 respectively, and to facilitate movement of the material through the respective openings. Bearing means 172 is carried by the rear wall 166 of the continued portion 162 of the conveyor housing for support of the shaft 95 of the conveyor means 94. The shaft 95 also extends through the center portion of the walls 154 and 155 of the two continued portions or hoppers.

A cylindrical member 173 of relatively coarse screen or other preforated material extends rearwardly from the cylindrical side wall 105 of the rotary member 103 forming a rotary screen. An inwardly extending helical member 174 is suitably affixed to the inner periphery of the rotating screen 173 so as to provide a helical path or passageway 175 from the rear of the cylindrical side wall portion 105 to the rearmost part of the combine. A cleaned grain receiving portion 176 extends across the bottom of the rotating screen 173 and up one side thereof as shown in FIG. 3. A diagonally disposed grain elevator housing 177 containing a grain elevator 178 communicates with and extends from the side of the grain receiving portion 176 up into the grain tank 82. A laterally extending auger 180 is contained within the receiving portion 176 and driven by the grain elevator 178 so as to move clean grain within the receiving portion into the path of the grain elevator for movement thereof up into the grain tank 82. A housing portion 184 is provided at the upper end of the grain elevator housing 177 which extends from the side of the grain tank to approximately the center thereof and of the combine. An auger 185, which is suitably powered as is the grain elevator by means (not shown) in driving connection with the engine 100, extends along the bottom of the housing portion 184 to move the grain which has been conveyed by the elevator 178 and fallen to the bottom of the housing to the center of the grain tank for symmetrical filling of the tank and centralized loading of the combine. A transversely extending auger 188 is disposed at the bottom of the lower triangular shaped portion of the grain tank to convey the grain into the reach of an upwardly extending unloading auger 190 received within a suitable circular housing 191 for unloading of the grain in the conventional manner. The augers 188 and 190 are also powered by suitable means (not shown) connected with the engine 100 of the combine.

The combine is operated from a control station 194, the combine being propelled as well as operated in its various grain handling and processing operations by an engine 100 which moves the machine on a pair of large forward wheels 197 and a pair of smaller wheels 198, through which latter wheels steering of the combine is effected in the usual manner.

Further considering the operation of the device, the grain together with the chaff and other matter received and aggregated by the hopper-like portions 49 and 86 of the housing portion 35 under the cylinders 39 and 55, respectively, is moved rearwardly by the screw conveyor 94 to the rear end of the portion 92 of the conveyor housing 93. The grain and other matter so conveyed falls through the opening 149 in the bottom of the conveyor housing 93 into the continually passing helical passages 129 of the rotary drum 103. Such grain and other matter is moved along the bottom of the rotating drum in the respective adjacent passages 129 towards the rear of the drum until the grain and other matter makes contact with and is backed up by the respective dams 130 of the first series thereof along the inside of the drum. At this stage rearward movement of the grain and other matter through the passages is arrested and the grain and other matter is carried up along the side of the drum by the elements 127 forming the sides of the respective passages until the grain and other matter spills out of the passages. The band member 133 located near the dams 130 forms closed pockets with the elements 127 so as to prevent spilling or dumping of the grain and other matter therein until the same has moved down the rearwardly downwardly inclined elements 127, after the spilling and dumping out of the contents of the passages beyond the band, to the rear edge 136 of the band 133 whereupon the grain and other matter is free to so spill or dump from the receiving passages 129. The dumping or discharge of the grain and other matter is therefore restricted to the relatively limited space between the rear edge of the band 136 and the series of dams 130.

After spilling or dumping, the grain and other matter falls through the open interior of the drum 103 to come under the influence of the air blast or wind created by the rotating fan 118. At least most of the chaff and other matter of less density than the grain itself is carried forwardly through the open interior of the drum by the current of air, out the open front end of the drum, and through the discharge opening 200 between the end of the drum and laterally extending rear wall portion 85 of the housing portion 35 extending below the grain tank, and thence to the ground.

The heavier grain particles together with whatever chaff and other matter was not blown out falls within the forward continued portion or hopper 151 of the conveyor housing 93 to be conveyed rearwardly by the first continued portion of the conveyor 94 therein for discharge through the second opening 160 and into the second section or portion of the helical passages 129, of the drum 103, continually passing therebelow. The grain together with whatever other matter there is moved rearwardly along the bottom of the rotating drum in the respective adjacent passages 129 toward the rear of the drum, as it was in the first section or portion of the passages, this time until stopped and backed up by the respective dams 131 of the second series thereof along the inside of the drum. The grain and other matter is then carried upwardly within the drum in the same manner as it previously was in the first or forward section of passages 129, the band 134 serving the same purpose as the first band 133 and the grain and other matter being discharged from the restricted space between the rear edge 137 of the band 134 and the second series of dams 131 in the same manner as it was from the discharge space in the first section. The grain together with whatever chaff and other matter there is once again falls through the open interior of the drum 103 to come under the influence of the air blast created by the fan 118. Whatever chaff and other undesired matter there is remaining of less density than the grain particles are again carried forwardly through the open interior of the drum by the current of air and out the open front end of the drum and through the discharge space 200 as before, the heavier grain falling within the second continued portion or hopper 162 of the conveyor housing 93 to be conveyed rearwardly by the second continued portion of the screw conveyor 94 therein for discharge through the third opening 165 and into the third and rearmost section or portion of the helical passages 129. Such grain together with any heavy foreign matter not blow out by the air blast is moved entirely rearwardly and out of the drum 103 and onto the rotating screen portion 173. The smaller grain particles fall through the openings of the screen into the cleaned grain receiving portion 175, being carried laterally by the longitudinal members 176 into the portion 177 and leaving the larger, heavier foreign matter not previously expelled by the air such as cockleburs and stones, for instance, on top of the screen to be discharged rearwardly by the helical element 174 behind the combine onto the ground. The now completely cleaned grain is further moved laterally by the auger 180 and upwardly by the grain elevator 178, as previously indicated, for filling of the grain tank 82.

The rotary means 53 also serves in the process of its straw separating function to open or finish opening the small percentage of hulls not already fully open and loosen the grain particles therefrom, thereby, in effect, fully completing the threshing process and eliminating any tailings and the necessary structure and parts for the return of the tailings to the threshing cylinder for rethreshing. This obviously also helps produce a smaller, lighter, more compact, more inexpensive combine with fewer parts to service and replace.

It is therefore seen that an exceptionally small, compact, and light weight combine has been provided which is also exceptionally smooth running and vibration free because of the elimination of all reciprocating parts and the use solely of three rotary grain processing components and in which combine a single centrally positioned, longitudinally disposed screw conveyor moves the grain particles and other matter from under the threshing cylinder and novel rotary straw removal means of this invention in the forward part of the device directly rearwardly and into the lowermost part of the longitudinally disposed novel rotary cleaning means of the invention, said single screw conveyor also extending substantially entirely through the lowermost part of the drum of the cleaning means for advancing the grain and other matter through the drum during the cleaning process, in cooperation with novel collecting means, and in a positive way unaffected by the terrain over which the combine moves, as is in fact the entire combine unaffected by the terrain because of the elimination of ordinary straw racks, cleaning pans, or the like, requiring a substantially horizontal disposition thereof and the use exclusively of rotary grain processing components, the single conveyor leaving the center portion of the interior of the drum clear and unobstructed for free flow of cleaning air from blowing means within the drum, and in which combine the threshing process is complete within the threshing and rotary straw removal components for the elimination of the otherwise necessary structure and parts for the return of tailings from the cleaning means back to the threshing cylinder for rethreshing.

It should be understood that such terms as "horizontal," "vertical," "top," and the like appearing in the specification and claims are only relative to the position of the device shown in the drawing, that is, when it is on perfectly level ground or the like, and are therefore not to be taken in the absolute sense when construing the claims.

Although the present invention has thus far been described in connection with the harvesting and processing of grain, it should be understood that embodiments of the invention may also be used for the harvesting and processing of crops which are not grain, such as grass seed or sorghum, for instance. The rotary cleaner may also be used for the separation of other matter consisting of particles of relatively heavy and lighter densities.

Although a particular and preferred embodiment of the invention has been described in this specification and illustrated in the drawing, modifications thereof and other forms of the invention in its various aspects are contemplated. The claims should accordingly be limited only by their own terms construed in the light of the overall, broad spirit of the invention in its various aspects.

What is claimed is:

1. In a threshing machine or the like, the combination comprising means for threshing harvested crop, means for separating out stalk from the threshed crop received from the threshing means, means for receiving the threshed crop from which the stalk has been removed, substantially horizontally disposed rotatable drum means having a side wall which is imperforate along at least a substantial extent of the length of the side wall, the drum means having at least generally helical open passage means extending along the inner periphery of the side wall thereof along at least a substantial portion of the imperforate extent of the side wall, means interrupting and blocking the passage means intermediate the ends thereof, conveyor means for conveying the threshed crop from which stalk has been removed from the receiving means into the drum means through an open end thereof, means for confining the matter conveyed extending along the conveyor means at least outside of the receiving means into the drum means and providing a pathway for the matter conveyed, the conveyor means being constructed to push the conveyed matter along the pathway for the conveyance thereof, the conveyor means and confining means providing the pathway extending into the drum means at substantially the lowermost part of the aforementioned at said open end thereof and extending along within at least a portion of the drum means substantially longitudinally to the drum means and adjacent the side wall and passage means of the drum means rotating thereunder during rotation of the drum means, the confining means being interrupted within the drum means at least at the bottom portion of the confining means so that the conveyed matter can fall from the confining means during operation of the conveyor means into the passage means rotating thereunder during rotation of the drum means and between the means blocking the passage means and the aforesaid open end of the drum means, the confining means continuing beyond the interruption thereof, at least the continued portion of the confining means being open at the top and having two portions extending outwardly and upwardly along opposite sides of the open top respectively so as to provide an entrance to the open top and continued portion which continually widens towards the outer upper limits of the portions, said portions of the continued portion extending outwardly and upwardly from said open top of the continued portion relatively closely to the side wall and passage means of the drum means on each side of the continued portion with the outer upper limits of each of said portions extending along said side wall and passage means, means for creating and causing wind to blow through the drum means in the direction of and out of said open end thereof, the continued portion being of such length and so positioned within the drum means as to receive at least the majority of the at least partially cleaned crop which prior to at least partial cleaning thereof piles up against the passage blocking means of the drum means and is carried up along the side of the drum means, during rotation of the drum means, emptying from the passage means and falling through the center portion of the drum means to come under the cleaning influence of the wind produced by the wind creating means which blows at least part of the undesirable matter including chaff out said end of the drum means, at least the majority of the at least partially cleaned crop falling into the continued portion and through the open top thereof, the conveyor means continuing within the continued portion of the confining means and being effective to push the at least partially cleaned crop therealong, the continued portion of the confining means being interrupted at least at the bottom portion thereof so that the at least partially cleaned crop conveyed within the continued portion can fall therefrom during operation of the conveyor means into the passage means, the continued portion of the confining means being of such length and the interruption thereof being so located as to allow the crop to fall from the continued portion into the passage means beyond the means blocking the passage means from said open end of the drum means.

2. The subject matter of claim 1, the conveyor means being a screw conveyor.

3. The subject matter of claim 1, the passage means of the drum means comprising a multiplicity of at least generally helical open passages side by side so extending along the inner periphery of the side wall of the drum means along at least a substantial portion of the imperforate extent of the side wall, the means interrupting and blocking the passage means interrupting and blocking the respective passages at at least generally the same location for each passage relative to a plane normal to the axis of rotation of the drum means.

4. The subject matter of claim 3 including means between the means blocking the passages and said open end of the drum means closing the inner open side of each of the passages over a limited extent of each forming pockets for containing, during rotation of the drum means, the matter deposited in the passages by the conveyor means without falling out of the passages for so long as the matter remains in the pockets, the means closing the open sides of the passages terminating in the direction away from said open end of the drum means in a line around the inside of the drum means falling in a plane normal to the axis of rotation of the drum means and spaced towards said open end of the drum means from the means blocking the passages so as to form a restricted area around the inside of the drum means from which the matter empties from the passages during rotation of the drum means to reduce the area over which at least partially cleaned crop falls and thereby the necessary length of the continued portion of the confining means receiving and collecting at least the majority of the crop after its fall.

5. The subject of claim 1, the conveyor means being a screw conveyor, the continued portion of the confining means additionally having wall means extending across the end thereof towards said open end of the drum means, the screw portion of the screw conveyor being interrupted at least for the presence of and non-interference from the wall means across the end of the continued portion, the central axial shaft portion of the screw conveyor extending past the wall means across the end of the continued portion.

6. The subject matter of claim 1 in which the means for separating out stalk comprises a rotary cylinder and a perforated at least generally arcuate means extending substantially across the cylinder and generally conformingly around a portion of the outside thereof and between which and the cylinder the threshed crop passes.

7. In a threshing machine or the like, the combination comprising means for threshing harvested crop, means for separating out stalk from the threshed crop received from the threshing means, means for receiving the threshed crop from which the stalk has been removed, rotatable drum means having a side wall which is imperforated along at least a substantial extent of the length of the side wall, the axis of rotation of the drum means being at least at a substantial angle to the vertical, the drum means having at least generally helical open passage means extending along the inner periphery of the side wall thereof along at least a substantial portion of the imperforated extent of the side wall, means interrupting and blocking the passage means intermediate the ends thereof, conveyor means for conveying the threshed crop from which stalk has been removed from the receiving means into the drum means through an open end thereof, means for confining the matter conveyed extending along the conveyor means at least outside of the receiving means into the drum means and providing a pathway for the matter conveyed, the conveyor means being constructed to push the conveyed matter along the pathway for the conveyance thereof, the conveyor means and confining means providing the pathway extending into the drum means at substantially the lowermost part of the aforesaid open end thereof and extending along within at least a portion of the drum means substantially longitudinally to the drum means and adjacent the side wall and passage means of the drum means rotating thereunder during rotation of the drum means, the confining means being interrupted within the drum means at least at a portion of the confining means closest to the side wall and passage means of the drum means rotating thereunder so that the conveyed matter can fall from the confining means during operation of the conveyor means into the passage means rotating thereunder during rotation of the drum means and between the means blocking the passage means and the aforesaid open end of the drum means, the confining means continuing beyond the interruption thereof, at least a continued portion of the confining means being open facing the axis of rotation of the drum means and having two portions extending outwardly along opposite sides of the opening respectively so as to provide an entrance to the opening and continued portion which continually widens towards the outer limits of the portions, said portions of the continued portion extending outwardly from said opening of the continued portion relatively closely to the side wall and passage means of the drum means on each side of the continued portion with the outer limits of each of said portions extending along said side wall and passage means, means for creating and causing wind to blow through the drum means in the direction of and out of said open end thereof, the continued portion being of such length and so positioned within the drum means as to receive at least the majority of the at least partially cleaned crop which prior to at least partial cleaning thereof piles up against the passage blocking means of the drum means and is carried up along the side of the drum means, during rotation of the drum means, emptying from the passage means and falling through the center portion of the drum means to come under the cleaning influence of the wind produced by the wind creating means which blows at least part of the undesirable matter including chaff out said end of the drum means, at least the majority of the at least partially cleaned crop falling into the continued portion and through the opening thereof, the conveyor means continuing within the continued portion of the confining means and being effective to push the at least partially cleaned crop therealong, the continued portion of the confining means being interrupted at least at a portion thereof closest to the side wall and passage means of the drum means rotating thereunder so that the at least partially cleaned crop conveyed within the continued portion can fall therefrom during operation of the conveyor means into the passage means, the continued portion of the confining means being of such length and the interruption thereof being so located as to allow the crop to fall from the continued portion into the passage means beyond the means blocking the passage means from said open end of the drum means.

8. In a combine, the combination comprising solely three harvested crop processing elements consisting of a rotary type thresher, a rotary type stalk remover operative on the harvested crop next after leaving the thresher, and a rotary type cleaner, and in addition a single conveyor for conveying the harvested and threshed crop from which stalk has been removed from under the thresher and stalk remover into the cleaner, the rotary type cleaner comprising rotatable drum means having a side wall which is imperforate along at least a substantial extent of the length of the side wall, the axis of rotation of the drum means being at least at a substantial angle to the vertical, the drum means having at least generally helical open passage means extending along the inner periphery of the side wall thereof along at least a substantial portion of the imperforate extent of the side wall, means interrupting and blocking the passage means intermediate the ends thereof, means extending under the thresher and stalk remover for receiving the harvested and threshed crop from which stalk has been removed, means for confining the matter conveyed extending along the conveyor at least outside of the receiving means and into the drum means through an open end thereof and providing a pathway for the matter conveyed, the conveyor and confining means extending into the drum means at substantially the lowermost part of the aforesaid open end thereof and extending along within at least a portion of the drum means substantially longitudinally to the drum means and adjacent the side wall and passage means of the drum means rotating thereunder during rotation of the drum means, the confining means being interrupted within the drum means at least at a portion of the confining means closest to the side wall and passage means of the drum means rotating thereunder so that the conveyed matter can fall from the confining means during operation of the conveyor into the passage means rotating thereunder during rotation of the drum means and between the means blocking the passage means and the aforesaid open end of the drum means, the confining means continuing beyond the interruption thereof, at least the continued portion of the confining means being open facing the axis of rotation of the drum means and having two portions extending outwardly along opposite sides of the opening respectively so as to provide an entrance to the opening and continued portion which continually widens toward the outer limits of the portions, said portions of the continued portion extending outwardly from said opening of the continued portion relatively closely to the side wall and passage means of the drum means on each side of the continued portion with the outer element of each of said portions extending along said side wall and passage means, means for creating and causing wind to blow through the drum means in the direction of and out said open end thereof, the continued portion being of such length and so positioned within the drum means as to receive at least the majority of the at least partially cleaned crop which prior to at least partial cleaning thereof piles up against the passage blocking means of the drum means and is carried up along the side of the drum means, during rotation of the drum means, emptying from the passage means and falling through the center portion of the drum means to come under the cleaning influence of the wind produced by the wind creating means which blows at least part of the undesirable matter including chaff out said end of the drum means, at least the majority of the at least partially cleaned crop falling into the continued portion and through the opening thereof, the conveyor continuing within the continued portion of the confining means and being effective to push the at least partially cleaned crop therealong, the continued portion of the confining means being interrupted at least at a portion thereof closest to the side wall and passage means of the drum means rotating thereunder so that the at least partially cleaned crop conveyed within the continued portion can fall therefrom during operation of the conveyor into the passage means, the continued portion of the confining means being of such length and the interruption thereof being so located as to allow the crop to fall from the continued portion into the passage means beyond the means blocking the passage means from said open end of the drum means.

9. The subject matter of claim 8, means interrupting and blocking the passage means intermediate the ends thereof and spaced from the first-named means interrupting and blocking the passage means in the direction away from said open end of the drum means, the confining means continuing beyond the interruption of the first-named continued portion thereof, the second-named continued portion of the confining means being open facing the axis of rotation of the drum means and having two portions extending outwardly along opposite sides of the opening respectively so as to provide an entrance into the opening and second-named continued portion which continually widens towards the outer limits of the portions, said portions of the second-named continued portion extending outwardly from said opening of the continued portion relatively closely to the side wall and passage means of the drum means on each side of the continued portion with the outer element of each of said portions extending along said side wall and passage means, the second-named continued portion being of such length and so positioned within the drum means as to receive at least the majority of the at least partially cleaned crop which prior to a second cleaning action within the drum means piles up against the second-named passage blocking means of the drum means and is carried up along the side of the drum means during rotation of the drum means emptying from the passage means and falling through the center portion of the drum means to come under the cleaning influence of the wind produced by the wind creating means which blows at least part of the undesirable matter including chaff out said end of the drum means, at least the majority of the at least partially cleaned crop falling into the second-named continued portion and through the opening thereof, the conveyor means continuing within the second-named continued portion of the confining means and being effective to push the at least partially cleaned crop therealong, the second-named continued portion of the confining means being interrupted at least at a portion thereof closest to the side wall and passage means of the drum means rotating thereunder so that the at least partially cleaned crop conveyed within the second-named continued portion can fall therefrom during operation of the conveyor means into the passage means, the second-named continued portion of the confining means being of such length and the interruption thereof being so located as to allow the crop to fall from the continued portion into the passage means beyond the second-named blocking means of the passage means in the direction away from said open end of the drum means.

10. In a threshing machine or the like, the combination comprising means for threshing harvested crop and means for separating out stalk from the threshed crop received from the threshing means, means for receiving the threshed crop from which stalk has been removed, substantially longitudinally extending rotatable drum means having a side wall which is imperforated along at least a substantial extent of the length of the side wall, the axis of rotation of the drum means being at least at a substantial angle to the vertical, the drum means having at least generally helical open passage means extending along the inner periphery of the side wall thereof along at least a substantial portion of the imperforated extent of the side wall, means interrupting and blocking the passage means intermediate the ends thereof, longitudinally extending conveyor means for conveying the threshed crop from which the stalk has been removed from the receiving means into the drum means through an open end thereof, means for confining the matter conveyed extending along the conveyor means at least outside of the receiving means into the drum means and providing a pathway for the matter conveyed, the conveyor means being constructed to push the conveyed matter along the pathway for the conveyance thereof, the conveyor means and confining means providing the pathway extending into the drum means at substantially the lowermost part of the aforesaid open end thereof and extending longitudinally within at least a portion of the drum means adjacent the side wall and passage means of the drum means rotating thereunder during rotation of the drum means, the confining means being interrupted within the drum means at least at a portion of the confining means closest to the side wall and passage means of the drum means rotating thereunder so that the conveyed matter can fall from the confining means during operation of the conveyor means into the passage means rotating thereunder during rotation of the drum means and between the means blocking the passage means and the aforesaid open end of the drum means, the confining means continuing beyond the interruption thereof, at least the continued portion of the confining means being open facing the axis of rotation of the drum means and having two portions extending outwardly along opposite sides of the opening respectively so as to provide an entrance to the opening and continued portion which continually widens towards the outer limits of the portions, said portions of the continued portion extending outwardly from said opening of the continued portion relatively closely to the side wall and passage means of the drum means on each side of the continued portion with the outer element of each of said portions extending along said side wall and passage means, means for creating and causing wind to blow through the drum means in the direction of and out of said open end thereof, the continued portion being of such length and so positioned within the drum means as to receive at least the majority of the at least partially cleaned crop which prior to at least partial cleaning thereof piles up against the passage blocking means of the drum means and is carried up along the side of the drum means, during rotation of the drum means emptying from the passage means and falling through the center portion of the drum means to come under the cleaning influence of the wind produced by the wind creating means which blows at least part of the undesirable matter including chaff out said end of the drum means, at least the majority of the at least partially cleaned crop falling into the continued portion and through the opening thereof, the conveyor means continuing within the continued portion of the confining means and being effective to push the at least partially cleaned crop therealong, the continued portion of the confining means being interrupted at least at a portion thereof closest to the side wall and passage means of the drum means rotating thereunder so that the at least partially cleaned crop conveyed within the continued portion can fall therefrom during operation of the conveyor means into the passage means, the continued portion of the confining means being of such length and the interruption thereof being so located as to allow the crop to fall from the continued portion into the passage means beyond the blocking means of the passage means from said open end of the drum means.

11. In a threshing machine or the like, the combination comprising means for threshing harvested crop, means for separating out stalk from the threshed crop received from the threshing means, means extending under the threshing means and means for separating out stalk for receiving the threshed crop from which stalk has been removed, longitudinally extending substantially horizontally disposed rotatable drum means behind the threshing means and means for separating out the stalk having a side wall which is imperforated along at least a substantial extent of the length of the side wall, the drum means having at least generally helical open passage means extending along the inner periphery of the side wall thereof along at least a substantial portion of the imperforated extent of the side wall, means interrupting and blocking the passage means intermediate the ends thereof, a longitudinally extending substantially horizontally disposed screw conveyor for conveying the threshed crop from which stalk has been removed rearwardly from the receiving means into the drum means through the open front end thereof, means for confining the matter conveyed extending along the screw conveyor at least outside of the receiving means into the drum means and providing a pathway for the matter conveyed, the screw conveyor and confining means providing the pathway extending into the drum means at substantially the lowermost part of the aforesaid front end thereof and extending longitudinally within at least a portion of the drum means adjacent the side wall and passage means of the drum means rotating thereunder during rotation of the drum means, the confining means being interrupted within the drum means at least at the bottom portion of the confining means so that the conveyed matter can fall from the confining means during operation of the conveyor into the passage means rotating thereunder during rotation of the drum means and between the means blocking the passage means and the aforesaid open end of the drum, the confining means continuing rearwardly beyond the interruption thereof, at least the continued portion of the confining means being open at the top and having two portions extending outwardly and upwardly along opposite sides of the open top respectively so as to provide an entrance to the open top and continued portion which continually widens towards the outer upper limits of the portions, said portions of the continued portion extending outwardly and upwardly from said open top of the continued portion relatively closely to the side wall and passage means of the drum means on each side of the continued portion with the outer upper element of each of said portions extending substantially longitudinally along said side wall and passage means, means for creating and causing wind to blow through the drum means in the direction of and out of said open front end thereof, the continued portion being of such length and so proportioned within the drum means as to receive at least the majority of the at least partially cleaned crop which prior to at least partial cleaning thereof piles up against the passage blocking means of the drum means and is carried up along the side of the drum means, during rotation of the drum means, emptying from the passage means and falling through the center portion of the drum means to come under the cleaning influence of the wind produced by the wind creating means which blows at least part of the undesirable matter including chaff out said open front end of the drum means, at least the majority of the at least partially cleaned crop falling into the continued portion and through the open top thereof, the screw conveyor continuing within the continued portion of the confining means and being effective to push the at least partially cleaned crop therealong, the continued portion of the confining means being interrupted at least at the bottom portion thereof so that the at least partially cleaned crop conveyed within the continued portion can fall therefrom during operation of the conveyor into the passage means, the continued portion of the confining means being of such length and interruption thereof being so located as to allow the crop to fall from the continued portion into the passage means beyond the blocking means of the passage means from said open end of the drum means.

12. The subject matter of claim 11, the threshing means comprising a transversely extending threshing cylinder and a transversely extending concave having openings through which crop particles and other matter can pass, the means for separating out stalk comprising a transversely extending rotary cylinder and transversely extending perforated at least generally arcuate means through which crop particles and other matter can pass extending substantially across the rotary cylinder and generally conformingly around a portion of the outside thereof and between which perforated means and the cylinder the threshed crop received from the threshing means passes, the means for receiving the threshed crop from which stalk has been removed comprising a pair of side wall means between which the threshing and stalk separating means are located, each side wall means including a portion extending downwardly at least slightly beyond the concave and then inwardly joining each other at a longitudinally extending central portion of substantially arcuate cross-section over at least a portion of the extent thereof, the crop receiving means further including a pair of spaced-apart transversely extending walls extending between said portions of the side wall means to form with said portions a first receiving portion for receiving the crop particles and other matter passing through the concave during threshing operation of the machine, each side wall means further including a portion extending downwardly at least slightly beyond the perforated means and then inwardly joining each other at a longitudinally extending central portion of substantially arcuate cross-section over at least a portion of the extent thereof, the crop receiving means further including a forward and rearward spaced-apart transversely extending wall means, the forward wall means extending between the second-named portions of the side wall means and the rearward wall means extending between the side wall means including the second-named portions thereof to form with the side wall means including the second-named portions thereof a second receiving portion for receiving the crop particles and other matter passing through the perforated means, the threshing means being forward of the means for separating out stalk, the rearward of the pair of transversely extending walls of the first receiving portion and forward transversely extending wall means of the second receiving means being spaced-apart and providing an exit from the machine for the stalk separated out by the stalk separating means, the confining means including a portion extending between and connecting the lower portions of the first and second receiving portions and being of circular cross-section, at least the substantially arcuate extent of each of the central portions of the crop receiving portions and at least the lowermost part of said portion of the confining means being in alignment and smooth continuity, the screw conveyor extending along at least the substantially arcuate extents of the central portions of the crop receiving portions and through said portion of the confining means extending between and connecting the crop receiving portions.

13. In a threshing machine or the like, the combination comprising rotatable drum means having a side wall which is imperforated along at least a substantial extent of the length of the side wall, the axis of rotation of the drum means being at least at a substantial angle to the vertical, the drum means having at least generally helical open passage means extending along the inner periphery of the side wall thereof along at least a substantial portion of the imperforated extent of the side wall, means interrupting and blocking the passage means intermediate the ends thereof, conveyor means for conveying threshed crop from which stalk has been removed into the drum means through an open end thereof, means for confining the matter conveyed extending along at least a portion of the conveyor means into the drum means and providing a pathway for the matter conveyed, the conveyor means being constructed to push the conveyed matter along the pathway for the conveyance thereof, the conveyor means and confining means providing the pathway extending into the drum means at substantially the lowermost part of the aforesaid open end thereof and extending along within at least a portion of the drum means substantially longitudinally to the drum means and adjacent the side wall and passage means of the drum means rotating thereunder during rotation of the drum means, the confining means being interrupted within the drum means at least at a portion of the confining means closest to the side wall and passage means of the drum means rotating thereunder so that the conveyed matter can fall from the confining means during operation of conveyor means into the passage means rotating thereunder during rotation of the drum means and between the means blocking the passage means and the aforesaid open end of the drum means, the confining means continuing beyond the interruption thereof, at least the continued portion of the confining means being open facing the axis of rotation of the drum means and having two portions extending outwardly along opposite sides of the opening respectively so as to provide an entrance to the opening and continued portion which continually widens towards the outer limits of the portions, said portions of the continued portion extending outwardly from said opening of the continued portion relatively closely to the side wall and passage means of the drum means on each side of the continued portion with the outer limits of each of said portions extending along said side wall and passage means, means for creating and causing wind to blow through the drum means in the direction of and out of said open end thereof, the continued portion being of such length and so positioned within the drum means as to receive at least the majority of the at least partially cleaned crop which prior to at least partial cleaning thereof piles up against the passage blocking means of the drum means and is carried up along the side of the drum means, during rotation of the drum means, emptying from the passage means and falling through the center portion of the drum means to come under the cleaning influence of the wind produced by the wind creating means which blows at least part of the undesirable matter including chaff out said end of the drum means, at least the majority of the at least partially cleaned crop falling into the continued portion and through the opening thereof, the conveyor means continuing within the continued portion of the confining means and being effective to push the at least partially cleaned crop therealong, the continued portion of the confining means being interrupted at least at a portion thereof closest to the side wall and passage means of the drum means rotating thereunder so that the at least partially cleaned crop conveyed within the continued portion can fall therefrom during operation of the conveyor means into the passage means, the continued portion of the confining means being of such length and the interruption thereof being so located as to allow the crop to fall from the continued portion into the passage means beyond the means blocking the passage means from said open end of the drum means.

14. The subject matter of claim 13, the conveyor means being a screw conveyor.

15. The subject matter of claim 13, the passage means of the drum means comprising a multiplicity of at least generally helical open passages side by side so extending along the inner periphery of the side wall of the drum means along at least a substantial portion of the imperforate extent of the side wall, the means interrupting and blocking the passage means interrupting and blocking the respective passages at at least generally the same location for each passage relative to a plane normal to the axis of rotation of the drum means.

16. The subject matter of claim 15 including means between the means blocking the passages and said open end of the drum means closing the inner open side of each of the passages over a limited extent of each forming pockets for containing, during rotation of the drum means, the matter deposited in the passages by the conveyor means without falling out of the passages for so long as the matter remains in the pockets, the means closing the open sides of the passages terminating in the direction away from said open end of the drum means in a line around the inside of the drum means falling in a plane normal to the axis of rotation of the drum means and spaced towards said open end of the drum means from the means blocking the passages so as to form a restricted area around the inside of the drum means from which the matter empties from the passages during rotation of the drum means to reduce the area over which the at least partially cleaned crop falls and thereby the necessary length of the continued portion of the confining means receiving and collecting at least the majority of the crop after its fall.

17. The subject matter of claim 13, the conveyor means being a screw conveyor, the continued portion of the confining means additionally having wall means extending across the end thereof towards said open end of the drum means, the screw portion of the screw conveyor being interrupted at least for the presence of and non-interference from the wall means across the end of the continued portion, the central axial shaft portion of the screw conveyor extending past the wall means across the end of the continued portion.

18. In a threshing machine or the like, the combination comprising substantially horizontally disposed rotatable drum means having a side wall which is imperforate along at least a substantial extent of the length of the side wall, the drum means having at least generally helical open passage means extending along the inner periphery of the side wall thereof along at least a substantial portion of the imperforate extent of the side wall, means interrupting and blocking the passage means intermediate the ends thereof, conveyor means for conveying threshed crop from which stalk has been removed into the drum means through an open end thereof, means for confining the matter conveyed extending along at least a portion of the conveyor means into the drum means and providing a pathway for the matter conveyed, the conveyor means being constructed to push the conveyed matter along the pathway for the conveyance thereof, the conveyor means and confining means providing the pathway extending into the drum means at substantially the lowermost part of the aforesaid open end thereof and extending along within at least a portion of the drum means substantially longitudinally to the drum means and adjacent the side wall and passage means of the drum means rotating thereunder during rotation of the drum means, the confining means being interrupted within the drum means at least at the bottom portion of the confining means so that the conveyed matter can fall from the confining means during operation of the conveyor means into the passage means rotating thereunder during rotation of the drum means and between the means blocking the passage means and the aforesaid open end of the drum means, the confining means continuing beyond the interruption thereof, at least the continued portion of the confining means being open at the top and having two portions extending outwardly and upwardly along opposite sides of the open top respectively so as to provide an entrance to the open top and continued portion which continually widens towards the outer upper limits of the portions, said portions of the continued portion extending outwardly and upwardly from said open top of the continued portion relatively closely to the side wall and passage means of the drum means on each side of the continued portion with the outer upper limits of each of said portions extending along said side wall and passage means, means for creating and causing wind to blow through the drum means in the direction of and out of said open end thereof, the continued portion being of such length and so positioned within the drum means as to receive at least the majority of the at least partially cleaned crop which prior to at least partial cleaning thereof piles up against the passage blocking means of the drum means and is carried up along the side of the drum means, during rotation of the drum means, emptying from the passage means and falling through the center portion of the drum means to come under the cleaning influence of the wind produced by the wind creating means which blows at least part of the undesirable matter including chaff out said end of the drum means, at least the majority of the at least partially cleaned crop falling into the continued portion and through the open top thereof, the conveyor means continuing within the continued portion of the confining means and being effective to push the at least partially cleaned crop therealong, the continued portion of the confining means being interrupted at least at the bottom portion thereof so that the at least partially cleaned crop conveyed within the continued portion can fall therefrom during operation of the conveyor means into the passage means, the continued portion of the confining means being of such length and the interruption thereof being so located as to allow the crop to fall from the continued portion into the passage means beyond the means blocking the passage means from said open end of the drum means.

References Cited in the file of this patent

UNITED STATES PATENTS

| | | |
|---|---|---|
| 131,192 | Stoker | Sept. 10, 1872 |
| 269,532 | McKnight et al. | Dec. 26, 1882 |
| 786,019 | Flesher | Mar. 28, 1905 |

FOREIGN PATENTS

| | | |
|---|---|---|
| 1,208,779 | France | Sept. 14, 1959 |